Jan. 16, 1923.  E. MOLLOY ET AL.  1,442,169.
AIRCRAFT.
FILED OCT. 5, 1920.

INVENTORS
Eddie Molloy and
Edward Summers Jenkins
BY
ATTORNEY

Patented Jan. 16, 1923.

1,442,169

UNITED STATES PATENT OFFICE.

EDDIE MOLLOY, OF ROSELLE PARK, NEW JERSEY, AND EDWARD SUMMERS JENKINS, OF GLEN COVE, NEW YORK, ASSIGNORS TO ALEXANDER KLEMIN, OF NEW YORK, N. Y.

AIRCRAFT.

Application filed October 5, 1920. Serial No. 414,764.

*To all whom it may concern:*

Be it known that we, EDDIE MOLLOY and EDWARD SUMMERS JENKINS, both citizens of the United States, and residents, respectively, of Roselle Park, in the county of Union and State of New Jersey, and at Glen Cove, in the county of Nassau and State of New York, have invented certain new and useful Improvements in Aircraft, of which the following is a specification.

This invention relates to wings of rigid material for aircraft and our improvement is directed particularly to cellular wing construction wherein fabrication is facilitated and the resulting product is characterized by great strength and lightness in weight.

Where a wing structure consists of a cover of rigid sheet material, with associated rigid bracing elements, difficulty may be experienced in uniting the parts, whether the union is to be effected by riveting or other means, because of the large expanse of wing surface and its internal relative inaccessibility.

Therefore we have devised a form of cellular or sectional rigid wing, composed of cells or units which interfit and which can be individually fitted one to another and secured in progressive wing production; also whereby the juxtaposed relation of the units imports into the combined structure a greater degree of strength than would be otherwise available.

Essentially our improved rigid wing consists of a number of hollow spanwise wing sections, each of full chord extent with aerofoil contour and said sections capable of being separately fitted and secured one to another. The interfitting may be telescopic in character, so that the wing assumes a tapered form as successive units are added, or the units may be so devised for interfitting that the wing will have the same spanwise bulk throughout.

The cells may also be stiffened individually by bracing means, to thereby increase the strength of the unified wing structure.

Other features and advantages of our invention will hereinafter appear.

In the example of our invention herein illustrated it is seen to consists of a series of shells formed of rigid sheet material, which shells we term cells or units, and which are capable of being fitted and secured together to comprise an aircraft wing. Each cell consists of the upper and lower portions 1, which together are intended to have full chordwise aerofoil conformation, and the vertical cell closure wall 2 at one side; whereas the opposite side of the cell is left open for the engaging reception of another cell or unit. The engagement between interfitting cells or units may be effected as by riveting, or other suitable securing means may be employed.

Figure 3:
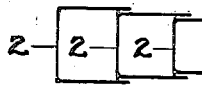
Figure 3 is a sectional view of a number of cells in telescopic, intercellular relation.
Figure 4:
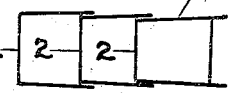
Figure 4 is a similar view of equal sized cells in intercellular relation.
Figure 5:
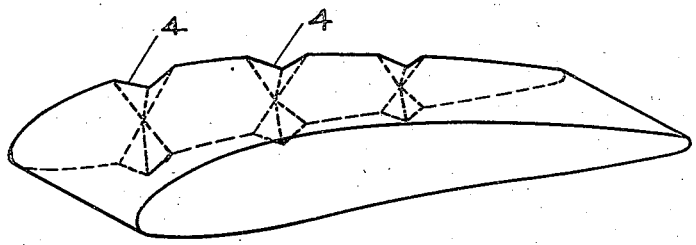
Figure 5 is a perspective elevation of a wing cell or unit with notched reinforcing means.
Figure 6:
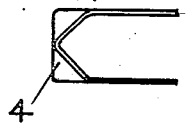
Figure 6 is a transverse section of Figure 5.
Figure 7:
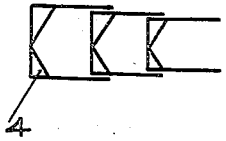
Figure 7 is a sectional view of a number of the cells shown in Figure 5 in telescopic, intercellular relation.
Figure 8:
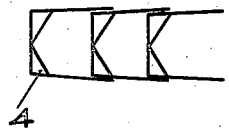
Figure 8 is a similar view of equal sized cells in intercellular relation.
Figure 9:
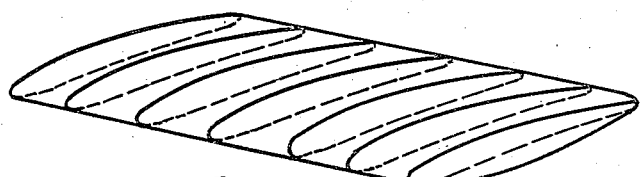
Figure 9 is a perspective plan view of a wing composed of cells or units.

As shown in Figure 3 the closed side of a cell or unit is entered within the open side of a slightly larger cell or unit to thus effect a telescopic joint, the wing structure thus produced by the assemblage of a sufficient number of cells or units having outwardly tapering formation, which may be desirable in some instances. But, in the example of Fig. 4, each cell or unit is of the same size, they being tapered toward their closed ends and flared toward their open ends, to thus permit interfitting without variation in the general thickness or depth of the wing.

Figure 1:
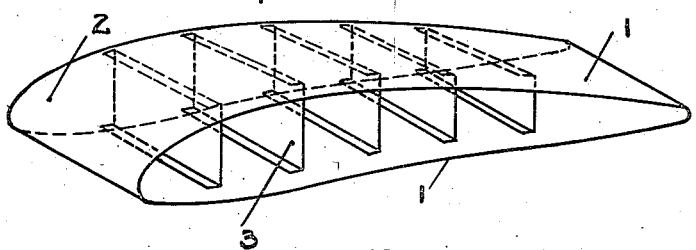
Figure 1 is a perspective elevation of a braced wing cell or unit.
Figure 2:
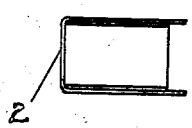
Figure 2 is a transverse section thereof.

In Figure 1, we have shown the cell or unit as provided with upended channels 3 of rigid material, lying spanwise therein, and in spaced, parallel relation chordwise thereof.

These channels are secured to the upper and lower portions of the cell or unit, and comprise stiffening braces therefor. Also, as shown in Figures 5, 6, 7 and 8, the closed side of the cell or unit may be inwardly dented or notched, as at 4, at the edges uniting the side closure and cover, to further stiffen and impart rigidity to the structure.

Figure 10:
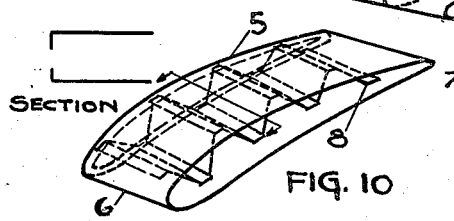
Figure 10 is a perspective elevation of a wing cell or unit having a modified form of internal bracing.

In Figure 10 a modification appears wherein the entering side of a cell or unit, instead of having a closure wall, is provided there with a stiffening flange 5. This cell construction consists of a sheet of rigid material, bent or folded at the leading edge 6, formed into a aerofoil shape, and having the two ends of the sheet meet at the rear in the production of the trailing edge 7. In this cell or unit example we have shown a brace as consisting of a corrugated or waved sheet of rigid material, whose corrugations or angular portions comprise web 8, that extend as beams, spanwise between the cover portions, to which they are connected at their vertices.

Variations within the spirit and scope of our invention are equally comprehended herein.

We claim:

A rigid unit for aircraft wing construction comprising sheet material shaped chordwise to aerofoil conformation, said unit having one side closed, and the other side open to engagingly receive the closed side of an adjacent, similar unit, and said unit being notched or dented at the edges of its closed side for stiffening purposes.

Signed at the borough of Manhattan, in the city, county, and State of New York, this 27th day of September A. D. 1920.

EDDIE MOLLOY.
EDWARD SUMMERS JENKINS.